(12) United States Patent
Yori

(10) Patent No.: US 6,240,951 B1
(45) Date of Patent: Jun. 5, 2001

(54) INFLATION SYSTEM AND VALVE FOR USE THEREIN

(75) Inventor: Richard Yori, Phoenix, AZ (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 09/476,029

(22) Filed: Dec. 31, 1999

(51) Int. Cl.[7] ........................................... F16K 17/14
(52) U.S. Cl. ................ 137/224; 137/505.13; 137/68.19; 222/3
(58) Field of Search ................................. 137/226, 224, 137/505.13, 68.19; 222/3, 5

(56) References Cited

U.S. PATENT DOCUMENTS

| | | | |
|---|---|---|---|
| 3,994,312 | * 11/1976 | Tanner et al. ........................ 137/226 |
| 4,368,009 | 1/1983 | Heimovics . | |
| 5,181,977 | * 1/1993 | Gneiding et al. ................ 137/224 X |
| 5,195,777 | * 3/1993 | Cuevas ................................. 222/3 X |
| 5,590,906 | * 1/1997 | Faigle et al. .......................... 222/3 X |
| 5,609,359 | * 3/1997 | Johnson et al. ...................... 222/3 X |
| 5,618,057 | * 4/1997 | Johnson et al. ...................... 222/3 X |
| 5,988,438 | 11/1999 | Lewis et al. . | |

* cited by examiner

*Primary Examiner*—John Rivell
*Assistant Examiner*—Meredith H. Schoenfeld
(74) *Attorney, Agent, or Firm*—Kathleen K. Bowen; David M. Ronyak

(57) ABSTRACT

A valve for use in an inflation system wherein the valve has a spring regulated piston which regulates the flow rate through the valve into the inflatable member, such that if the flow rate gets too high, the regulating piston will divert some or all of the flow out a neutral thrust over pressure relief vent, which vents outside the inflatable member. The valve also has a secondary form of overpressure relief in the form of a neutral thrust diffuser which also dumps outside of the inflatable member. Fluid is prevented from flowing out of the neutral thrust diffuser by a burst disk, but if the fluid pressure is high enough, the burst disk will burst, and the fluid will flow out of the neutral thrust diffuser.

20 Claims, 4 Drawing Sheets

TO INFLATABLE MEMBER OR ASPIRATOR

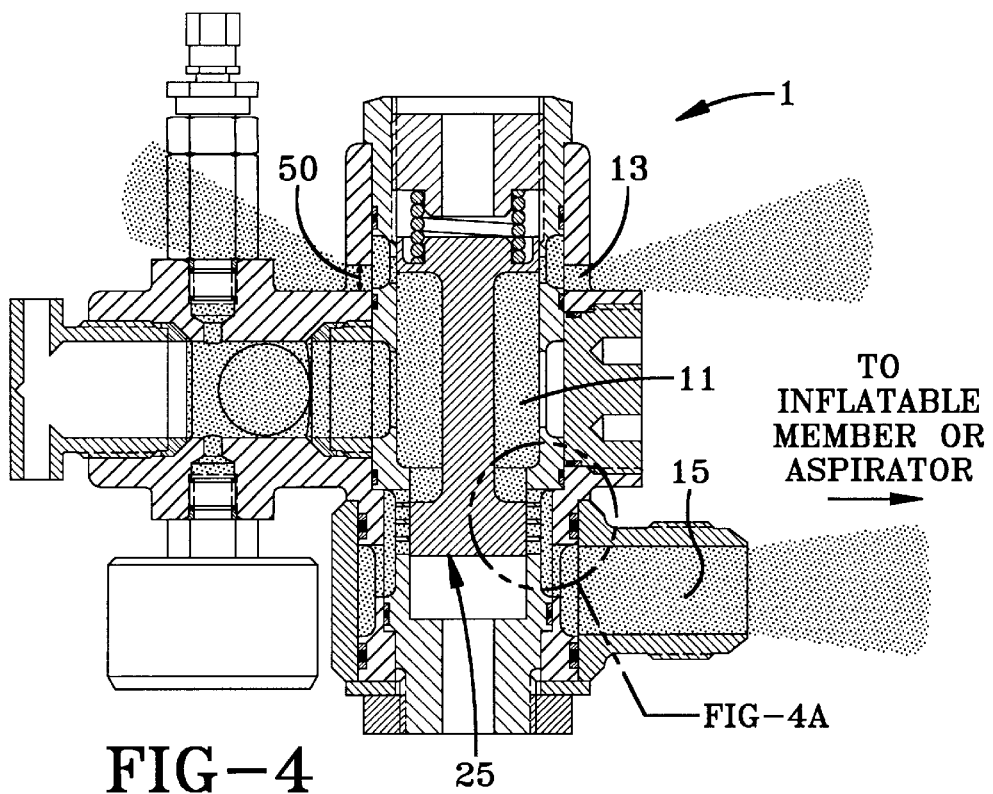
FIG-4
FIG-4A
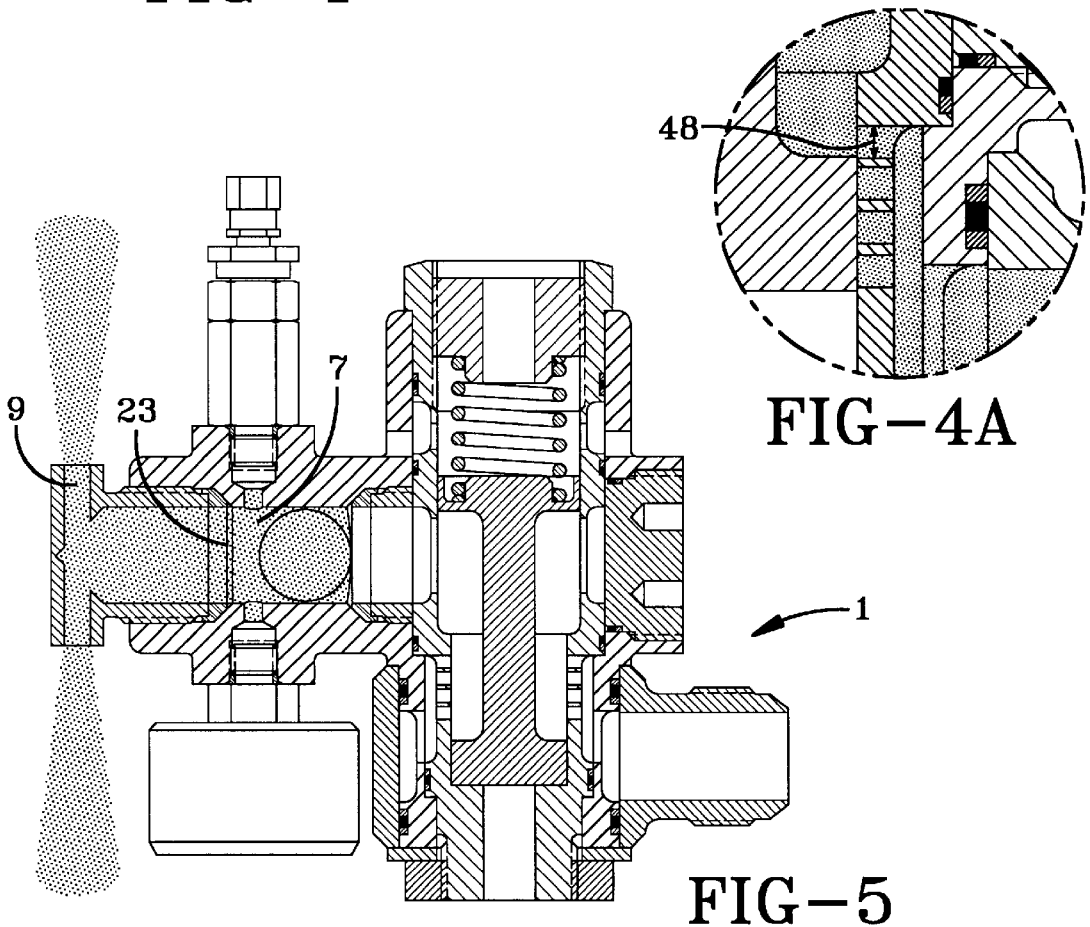
FIG-5

INFLATION SYSTEM AND VALVE FOR USE THEREIN

BACKGROUND

The present invention is directed towards an inflation system and a valve for use in an inflation system. The present invention is particularly suited for inflating inflatable members, such as the emergency exit slides, life rafts, etc. carried on commercial aircraft.

The present invention inflation system utilizes the apparatus for rapid inflation of inflatable objects and related method described in U.S. Pat. No. 5,988,438 by Lewis et. al, and hereby incorporated herein by reference.

The present state of the art in inflation systems for emergency exit slides and rafts in commercial aircraft includes a source of gas which flows into an aspirator, which then flows into the inflatable member. Regardless of which type of gas source is used (stored compressed gas, pyrotechnic gas generator etc.) there is a problem due to the wide ambient temperature range within which the inflation systems are required to operate. The temperature range over which these systems are required to function is from −40° F. to 140° F. The amount of gas available must be enough to pressurize the inflatable element at the coldest temperature. Because of the relationship between pressure and temperature with a fixed volume, as the ambient temperature rises above the minimum, the gas source provides too much pressure. To keep the inflatable member from failing due to stress from this high pressure, relief valves are incorporated into the inflatable member to maintain the desired pressure. Multiple relief valves are usually necessary. These relief valves add a significant amount of weight to the inflation system, take up a significant amount of space, and add cost. An inflation system is desired which can reduce the number and size of relief valves necessary, thereby significantly reducing the weight, cost, and required space of the inflation system.

SUMMARY OF THE INVENTION

A valve comprising a valve body with an inlet port, a charging port, a first chamber, a neutral thrust diffuser, a second chamber, a neutral thrust over pressure relief vent, and an outlet port.

The inlet port, and the charging port are in fluid communication with the first chamber, and the first chamber has a first outlet and a second outlet. The first outlet is blocked by a blocking means, and the second outlet is blocked by a secondary burst disk. The blocking means prevents fluid communication between the first chamber and the second chamber. An actuating means will rupture the blocking means at a predetermined actuation point. The second chamber is in fluid communication with the outlet port, and/or the neutral thrust over pressure relief vent.

A regulating piston comprises a piston and a regulating spring wherein the piston slidably moves within the second chamber such that the regulating piston allows fluid communication between the second chamber and the neutral thrust over pressure relief vent, or between the second chamber and the outlet port, or both.

The secondary burst disk prevents fluid communication between the first chamber and the neutral thrust diffuser.

Cross-sectional flow area one is the cross-sectional area of the outlet port which is in fluid communication with the second chamber, two examples of this are shown in Detail A and Detail B. Cross-sectional flow area two is the cross sectional area of the neutral thrust over pressure relief vent which is in fluid communication with the second chamber.

When the actuating means ruptures the blocking means, the fluid flows from the first chamber through the first outlet and into the second chamber. The fluid exerts pressure on the piston, and slidably moves the piston within the second chamber, such that increased fluid pressure causes the regulating piston to move in a manner which decreases the cross-sectional flow area one. As the fluid pressure continues to increase, the cross-sectional flow area one continues to decrease, and the piston slidably moves to a position which allows fluid communication between the second chamber and the neutral thrust over pressure relief vent. With increasing fluid pressure the cross-sectional flow area one continues to decrease, and the cross-sectional flow area two continues to increase, until the piston can no longer move due to the constraints of the second chamber in combination with the regulating spring.

As the fluid pressure decreases, the piston slidably moves such as to decrease the cross-sectional flow area two, and increase the cross-sectional flow area one.

If the fluid in the first chamber reaches a pressure equal to the burst pressure of the secondary burst disk, the secondary burst disk will burst, allowing the fluid to exit the first chamber through the neutral thrust diffuser.

BRIEF DESCRIPTION OF THE DRAWINGS

FIG. 4 is a cross-sectional view of an aspect of a valve according to the invention, in use at a third point in time.

FIG. 4A is a detail of cross-sectional flow area two.

FIG. 5 is a cross-sectional view of an aspect of a valve according to the invention, in use during an overpressure event.

DETAILED DESCRIPTION

Figure 1:
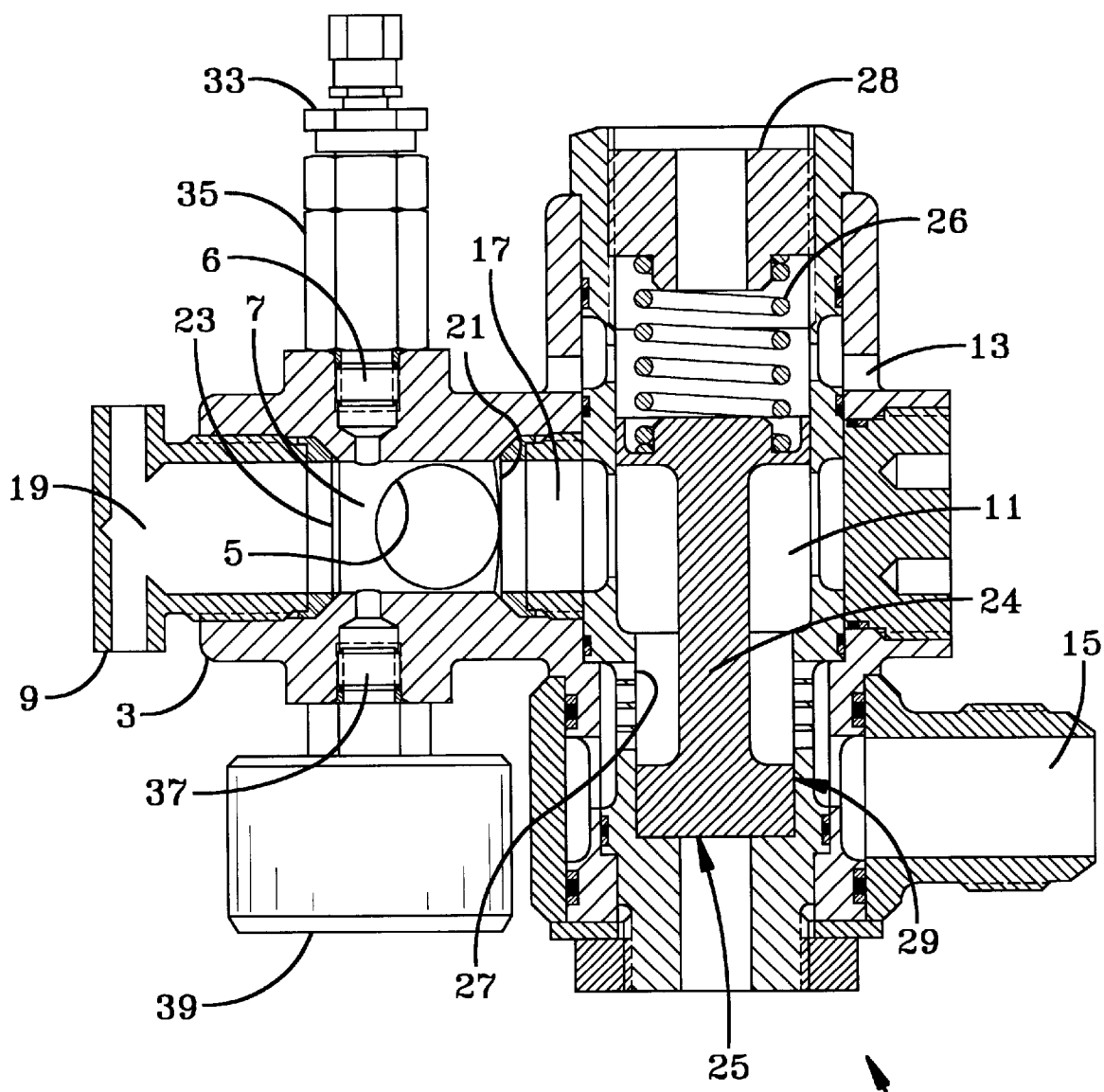
FIG. 1 is a cross-sectional view of an aspect of a valve according to the invention.
Figure 2:
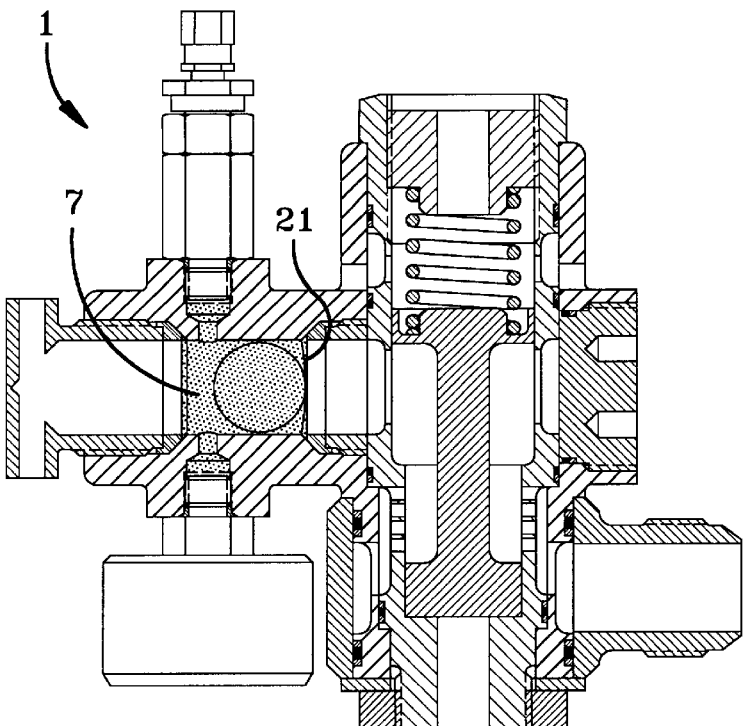
FIG. 2 is a cross-sectional view of an aspect of a valve according to the invention, in use at a first point in time.

Various aspects of the invention are presented in FIGS. 1–6 which are not drawn to scale, and wherein like components are numbered alike. Referring now to FIG. 1, according to an aspect of the invention, a valve 1 for use in an inflation system is shown. The valve 1 comprises a valve body 3 with an inlet port 5, a charging port 6, a first chamber 7, a neutral thrust diffuser 9, a second chamber 11, a neutral thrust over pressure relief vent 13, and an outlet port 15.

Still referring to FIG. 1, the inlet port 5, and the charging port 6 are in fluid communication with the first chamber 7, and the first chamber 7 has a first outlet 17 and a second outlet 19. The first outlet 17 is blocked by a blocking means 21, and the second outlet 19 is blocked by a secondary burst disk 23. The blocking means 21 prevents fluid communication between the first chamber 7 and the second chamber 11. An actuating means will rupture the blocking means 21 at a predetermined actuation point. The second chamber 11 is in fluid communication with the outlet port 15, and/or the neutral thrust over pressure relief vent 13.

A regulating piston 25 comprises a piston 24 and a regulating spring 26 wherein the piston 24 slidably moves within the second chamber 11 such that the regulating piston 25 allows fluid communication between the second chamber 11 and the neutral thrust over pressure relief vent 13, or between the second chamber 11 and the outlet port 15, or both.

The secondary burst disk 23 prevents fluid communication between the first chamber 7 and the neutral thrust diffuser 9.

Figure 3A:
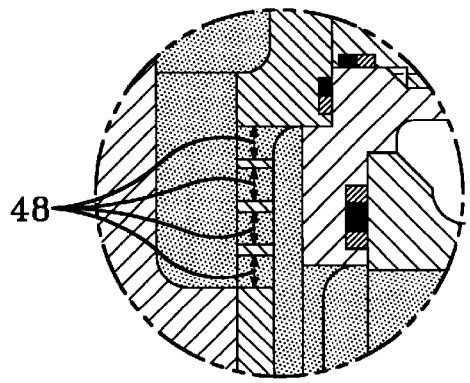
FIG. 3A is a detail of cross-sectional flow area one.
Figure 3:
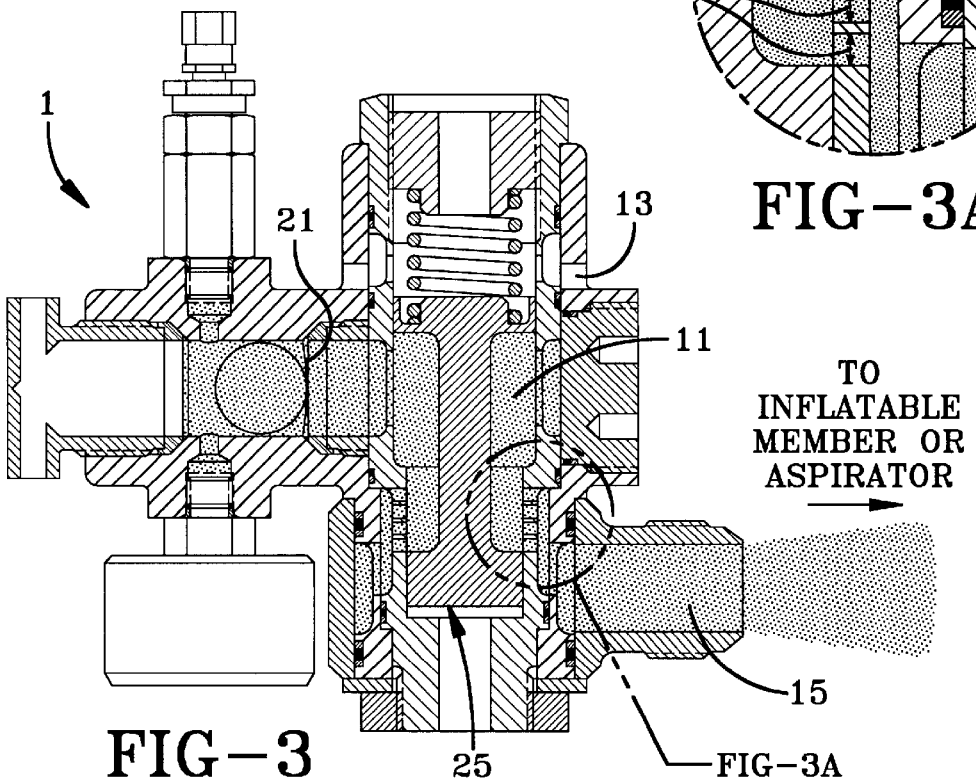
FIG. 3 is a cross-sectional view of an aspect of a valve according to the invention, in use at a second point in time.

Referring now to FIGS. 3–5, these figures show various ways in which fluid can flow through the valve. Cross-sectional flow area one 48 is the cross-sectional area of the outlet port 15 which is in fluid communication with the second chamber 11, two examples of this are shown in FIG. 3A and FIG. 4A. Cross-sectional flow area two 50 is the cross sectional area of the neutral thrust over pressure relief vent 13 which is in fluid communication with the second chamber 11. The directional arrows in FIG. 3A and FIG. 4A show the direction in which the cross-sectional flow area is measured, which is perpendicular to the direction of the flow.

When the actuating means ruptures the blocking means 21, the fluid flows through to the second chamber 11 this is illustrated in FIG. 3. The fluid exerts pressure on the regulating piston 25, and slidably moves the piston 24 within the second chamber 11, such that increased fluid pressure causes the regulating piston 25 to move in a manner which decreases the cross-sectional flow area one 48. As the fluid pressure continues to increase, the cross-sectional flow area one 48 continues to decrease, and the piston 24 slidably moves to a position which allows fluid communication between the second chamber 11 and the neutral thrust over pressure relief vent 13 this is illustrated in FIG. 4. With increasing fluid pressure the cross-sectional flow area one 48 continues to decrease, and the cross-sectional flow area two 50 continues to increase, until the piston 24 can no longer move due to the constraints of the second chamber 11 in combination with the regulating spring 26.

As the fluid pressure decreases, the piston 24 slidably moves such as to decrease the cross-sectional flow area two 50, and increase the cross-sectional flow area one 48.

If the fluid in the first chamber 7 reaches a pressure equal to the burst pressure of the secondary burst disk 23, the secondary burst disk 23 will burst, allowing the fluid to exit the first chamber 7 through the neutral thrust diffuser 9 this is illustrated in FIG. 5.

According to a further aspect of the invention, when the piston 24 can no longer move due to the constraints of the second chamber 11 in combination with the regulating spring 26, the piston 24 blocks all fluid communication between the second chamber 11 and the outlet port 15, such that all fluid is flowing out of the neutral thrust over pressure relief vent 13.

In a preferred embodiment of the invention, the piston 24 will slidably move to change the cross-sectional flow area one 48 and the cross-sectional flow area two 50 in a manner which will control the flow rate to meet particular mass flow output rates.

According to an aspect of the invention, a fill valve 33 and a fusible plug 35 are installed in the charging port 6. In a further aspect of the invention, the valve body 3 has a second port 37, and a pressure indication device 39 is installed in the second port 37.

In a preferred embodiment of the invention, the valve body 3 has both a charging port 5 and a second port 37. A fill valve 33 and a fusible plug 35 are installed in the charging port 5; and a pressure indication device 39 is installed in the second port 37. For convenience, both ports may be standard MS33649 ports.

In a further preferred embodiment of the invention, the regulating piston 25 further comprises a regulating spring adjuster 28. Use of a regulating spring adjuster 28 can compensate for tolerances in the spring rate of the regulating spring 26. This is done by moving the regulating spring adjuster 28 either closer to the piston 24 to further compress the regulating spring 26, or further from the piston 24 to allow the regulating spring 26 to further expand. This enables a designer to more accurately meet specified mass flow output criteria.

In a preferred embodiment of the invention, the blocking means 21 is a primary burst disk, and the actuating means is the fluid pressure, such that when the fluid pressure in the first chamber 7 is above the burst pressure of the primary burst disk, the burst disk will burst, allowing the fluid to flow into the second chamber 11. When a primary burst disk is used, the burst pressure for the primary burst disk will be less than the burst pressure for the secondary burst disk 23. There are other blocking means and actuating means which are well known in the art, and which would also be suitable. For example, a burst disk whose burst pressure is above expected fluid pressure could be used for the blocking means. A spring operated knife blade could be used for the actuation means; either with manual actuation, or with a pyrotechnic gas source such as a squib to provide the force necessary to thrust the knife blade through the burst disk. As another example, the blocking means may be a burst disk with a burst pressure which is less than the lowest expected fluid pressure, but which is supported by a removable support means. The actuation means in this case would be removing the burst disk support, so that the fluid pressure is able to burst the disk, and flow through to the second chamber.

Figure 6:
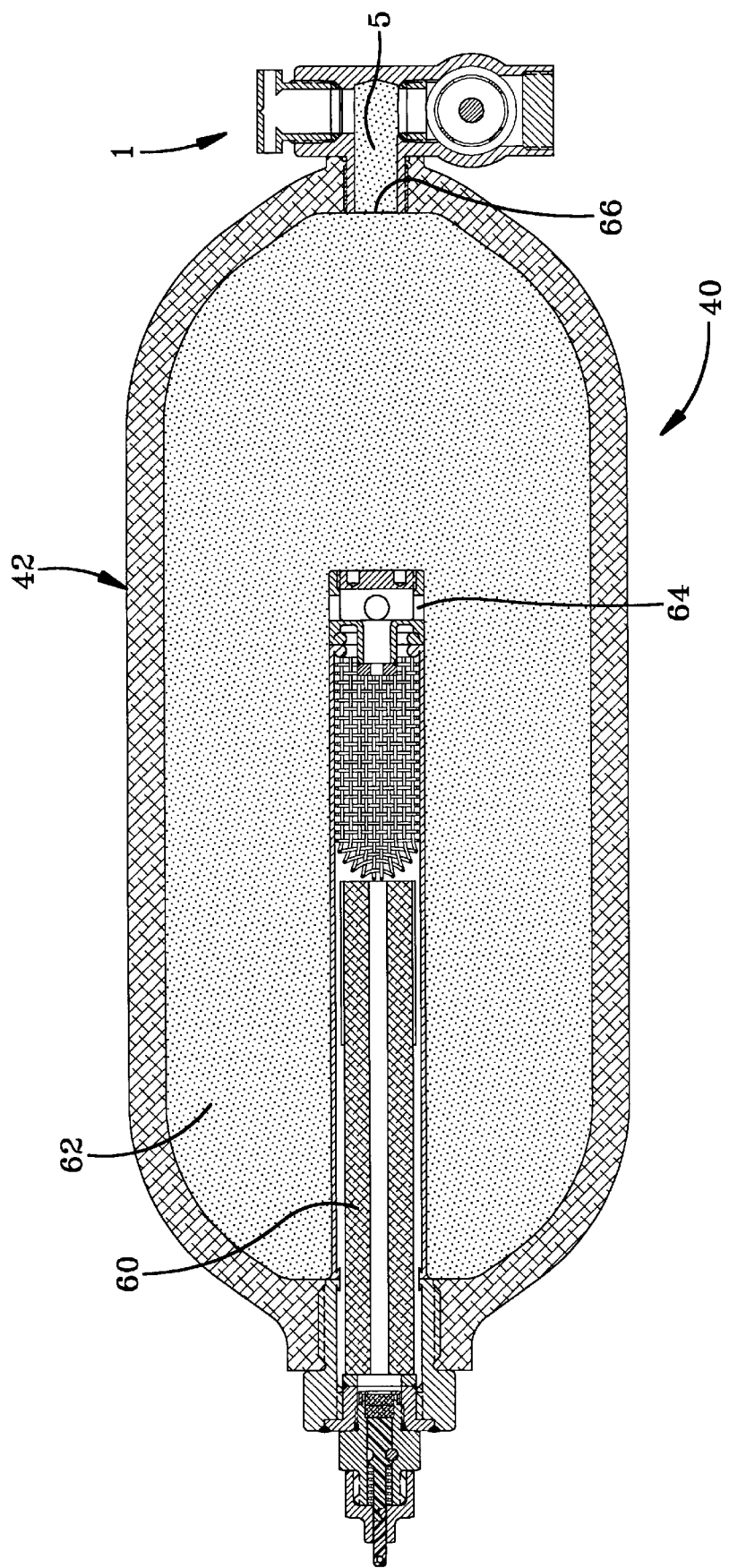
FIG. 6 is a cross-sectional view of an aspect of an inflation system according to the invention.

FIG. 6 depicts the invention inflation system 40 for inflation of an inflatable member, comprising a gas source 42, and any aspect of the valve 1 as described above.

In a further aspect of the invention, the gas source 42 is a stored pressurized gas source. Alternatively, the gas source 42 is a pyrotechnic gas generator source.

In a preferred embodiment of the invention, the gas source 42 is an inflator device adapted for producing a sufficient quantity of a gaseous product to substantially inflate an inflatable member operatively associated therewith, comprising: a first stage gas source 60; a second stage gas source product to substantially inflate an inflatable member operatively associated therewith, comprising: a first stage gas source 60; a second stage gas source 62 of liquefied gas in fluid communication at a first location 64 with the first stage gas source 60 and at a second location 66, with the valve 1. Wherein the first stage gas source 60 is capable of providing a sufficient quantity of gas at a sufficiently high temperature to vaporize substantially all of the liquefied gas in the second stage gas source 62.

In a further preferred embodiment, the inflation system 40 further comprises an aspirator which receives the fluid from the valve outlet port 15, and also pulls in ambient air, and allows the combination to flow through to the inflatable member. Suitable aspirators are well known to those in the art of inflation systems for inflating inflatable members, such as the emergency exit slides, life rafts, etc. carried on commercial aircraft. One example of suitable aspirators are those described in U.S. Pat. No. 4,368,009 by Heimovics and Seabase, which is hereby incorporated by reference.

In a particular preferred embodiment of the present invention, the first stage gas source 60 and the second stage gas source 62 are in fluid communication, such that, gas produced or stored in the first stage is introduced into the liquefied gas in the second stage gas source 62, thereby vaporizing the liquefied gas and increasing the pressure within the second stage gas source 62. The second stage gas source 62 is in constant fluid communication with the first chamber 7 of the valve 1. The increased pressure within the second stage gas source 62 thus translates into increased pressure within the first chamber 7 of the valve 1. The valve 1 is preferably a high strength aluminum forged body, anodized and sealed following machining. When this increased pressure is high enough, it causes the primary burst disk to burst, allowing the gas to continue on to the second chamber 11 of the valve 1. The burst disks are preferably stainless steel.

Once in the second chamber 11 of the valve 1, the gas pressure will act on the regulating piston 25. The piston 24 is preferably 6061-T6 aluminum alloy, with a hard coat anodized coating after machining, and a minimum 16 RMS surface finish in the contact areas. The inside wall 27 of the second chamber 11 that the piston 24 rides in is preferably the same material, treatment, and finish as the piston 24. The clearance between the in. The regulating spring 26 is preferably stainless steel. All stainless steel hardware that contacts aluminum hardware is preferably passivated, and then cadmium plated to minimize the potential for electro-galvanic corrosion.

What is claimed is:

1. A valve for use in an inflation system, comprising:
   a valve body with an inlet port, a charging port, a first chamber, a neutral thrust diffuser, a second chamber, a neutral thrust over pressure relief vent, and an outlet port;
   wherein said inlet port is in fluid communication with said first chamber;
   wherein said charging port is in fluid communication with said first chamber;
   wherein said first chamber has a first outlet and a second outlet;
   wherein said first outlet is blocked by a blocking means, and said second outlet is blocked by a secondary burst disk;
   wherein said blocking means prevents fluid communication between said first chamber and said second chamber;
   wherein an actuating means will rupture said blocking means at a predetermined actuation point;
   wherein said second chamber is in fluid communication with said outlet port, and/or said neutral thrust over pressure relief vent;
   a regulating piston comprising a piston, and a regulating spring, wherein said piston slidably moves within said second chamber such that said regulating piston allows fluid communication between said second chamber and said neutral thrust over pressure relief vent, or between said second chamber and said outlet port, or both;
   wherein said secondary burst disk prevents fluid communication between said first chamber and said neutral thrust diffuser;
   wherein when fluid flows from said second chamber to said outlet port, the fluid flows through a cross-sectional flow area one, which is the cross sectional area of said outlet port which is in fluid communication with said second chamber;
   wherein when fluid flows from said second chamber to said neutral thrust over pressure relief vent, the fluid flows through a cross-sectional flow area two which is the cross sectional area of said neutral thrust over pressure relief vent which is in fluid communication with said second chamber;
   wherein when said actuating means ruptures said blocking means, the fluid flows through to said second chamber, wherein the fluid exerts pressure on said regulating piston, and slidably moves said piston within said second chamber, such that increased fluid pressure causes the regulating piston to move in a manner which decreases said cross-sectional flow area one, as the fluid pressure continues to increase, said cross-sectional flow area one continues to decrease, and said piston slidably moves to a position which allows fluid communication between said second chamber and said neutral thrust over pressure relief vent, with increasing fluid pressure said cross-sectional flow area one continues to decrease, and said cross-sectional flow area two continues to increase, until said piston can no longer move due to the constraints of said second chamber in combination with said regulating spring;
   wherein as the fluid pressure decreases, said piston slidably moves such as to decrease said cross-sectional flow area two, and increase said cross-sectional flow area one; and
   wherein if the fluid in the first chamber reaches a pressure equal to the burst pressure of said secondary burst disk, said secondary burst disk will burst, allowing the fluid to exit said first chamber through said neutral thrust diffuser.

2. The valve of claim 1 wherein when said piston can no longer move due to the constraints of said second chamber in combination with said regulating spring, said piston blocks all fluid communication between said second chamber and said outlet port, such that all fluid is flowing out of said neutral thrust over pressure relief vent.

3. The valve of claim 1 wherein said regulating piston will move to change said cross-sectional flow area one and said cross-sectional flow area two in a manner which will control the flow rate to meet particular mass flow output rates.

4. The valve of claim 1 wherein said blocking means is a primary burst disk, and said actuating means is the fluid pressure, such that when the fluid pressure in said first chamber is above the burst pressure of said primary burst disk, said burst disk will burst, allowing the fluid to flow into the second chamber.

5. The valve of claim 1 wherein a fill valve and a fusible plug are installed in said charging port.

6. The valve of claim 1 wherein said valve body has a second port, and wherein a pressure indication device is installed in said second port.

7. The valve of claim 1 wherein a fill valve and a fusible plug are installed in said charging port; and, wherein said valve body has a second port; and, wherein a pressure indication device is installed in said second port.

8. The valve of claim 1 wherein said regulating piston further comprises a regulating spring adjuster.

9. An inflation system for inflation of an inflatable member, comprising:
   a gas source;
   a valve comprising a valve body with an inlet port, a charging port, a first chamber, a neutral thrust diffuser, a second chamber, a neutral thrust over pressure relief vent, and an outlet port;
   wherein said inlet port is in fluid communication with said first chamber;

wherein said charging port is in fluid communication with said first chamber;

wherein said first chamber is in constant fluid communication with said gas source, and said first chamber has a first outlet and a second outlet;

wherein said first outlet is blocked by a blocking means, and said second outlet is blocked by a secondary burst disk;

wherein said blocking means prevents fluid communication between said first chamber and said second chamber;

wherein an actuating means will rupture said blocking means at a predetermined actuation point;

wherein said second chamber is in fluid communication with said outlet port, and/or said neutral thrust over pressure relief vent;

a regulating piston comprising a piston and a regulating spring, wherein said piston slidably moves within said second chamber such that said regulating piston allows fluid communication between said second chamber and said neutral thrust over pressure relief vent, or between said second chamber and said outlet port, or both;

wherein said secondary burst disk prevents fluid communication between said first chamber and said neutral thrust diffuser;

wherein when fluid flows from said second chamber to said outlet port, the fluid flows through a cross-sectional flow area one, which is the cross sectional area of said outlet port which is in fluid communication with said second chamber;

wherein when fluid flows from said second chamber to said neutral thrust over pressure relief vent, the fluid flows through a cross-sectional flow area two which is the cross sectional area of said neutral thrust over pressure relief vent which is in fluid communication with said second chamber;

wherein when said actuating means ruptures said blocking means, the fluid flows through to said second chamber, wherein the fluid exerts pressure on said regulating piston, and slidably moves said piston within said second chamber, such that increased fluid pressure causes the regulating piston to move in a manner which decreases said cross-sectional flow area one, as the fluid pressure continues to increase, said cross-sectional flow area one continues to decrease, and said piston slidably moves to a position which allows fluid communication between said second chamber and said neutral thrust over pressure relief vent, with increasing fluid pressure said cross-sectional flow area one continues to decrease, and said cross-sectional flow area two continues to increase, until said piston can no longer move due to the constraints of said second chamber in combination with said regulating spring;

wherein as the fluid pressure decreases, said piston slidably moves such as to decrease said cross-sectional flow area two, and increase said cross-sectional flow area one; and, wherein if the fluid in the first chamber reaches a pressure equal to the burst pressure of said secondary burst disk, said secondary burst disk will burst, allowing the fluid to exit said first chamber through said neutral thrust diffuser.

10. The inflation system of claim 9 wherein said regulating piston will move to change said cross-sectional flow area one and said cross-sectional flow area two in a manner which will control the flow rate to meet particular mass flow output rates.

11. The inflation system of claim 9 wherein when said piston can no longer move due to the constraints of said second chamber in combination with said regulating spring; said piston blocks all fluid communication between said second chamber and said outlet port, such that all fluid is flowing out of said neutral thrust over pressure relief vent.

12. The valve of claim 1 wherein said blocking means is a primary burst disk, and said actuating means is the fluid pressure, such that when the fluid pressure in said first chamber is above the burst pressure of said primary burst disk, said burst disk will burst, allowing the fluid to flow into the second chamber.

13. The inflation system of claim 9 wherein said gas source is a stored pressurized gas source.

14. The inflation system of claim 9 wherein said gas source is a pyrotechnic gas generator source.

15. The inflation system of claim 9 wherein said gas source is an inflator device adapted for producing a sufficient quantity of a gaseous product to substantially inflate said inflatable member operatively associated therewith, comprising:

a first stage gas source;

a second stage gas source of liquefied gas in fluid communication at a first location with said first stage gas source and at a second location, with said valve; and, wherein the first stage gas source is capable of providing a sufficient quantity of gas at a sufficiently high temperature to vaporize substantially all of the liquefied gas in the second stage gas source.

16. The inflation system of claim 9 wherein a fill valve and a fusible plug are installed in said charging port.

17. The inflation system of claim 9 wherein said valve body has a second port, and wherein a pressure indication device is installed in said second port.

18. The inflation system of claim 9 wherein a fill valve and a fusible plug are installed in said charging port; and, wherein said valve body has a second port; and, wherein a pressure indication device is installed in said second port.

19. The inflation system of claim 9 wherein said system further comprises an aspirator which receives the fluid from said valve outlet port.

20. The inflation system of claim 9 wherein said regulation piston further comprises a regulating spring adjuster.

* * * * *